US008806488B2

(12) United States Patent
Kang et al.

(10) Patent No.: US 8,806,488 B2
(45) Date of Patent: Aug. 12, 2014

(54) SYSTEM FOR MANAGING PERSONALIZATION INFORMATION OF VIRTUAL MACHINE BASED ON CLOUD COMPUTING AND METHOD THEREOF

(75) Inventors: Kyu Chang Kang, Daejeon (KR); Dong Oh Kang, Daejeon (KR); Hyung Jik Lee, Daejeon (KR); Jeun Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 287 days.

(21) Appl. No.: 13/304,511

(22) Filed: Nov. 25, 2011

(65) Prior Publication Data
US 2012/0151481 A1 Jun. 14, 2012

(30) Foreign Application Priority Data
Dec. 9, 2010 (KR) .......................... 10-2010-0125858

(51) Int. Cl.
G06F 9/455 (2006.01)
(52) U.S. Cl.
USPC ............................................................ 718/1
(58) Field of Classification Search
None
See application file for complete search history.

(56) References Cited

U.S. PATENT DOCUMENTS

| 2007/0186212 | A1* | 8/2007 | Mazzaferri et al. ................ 718/1 |
| 2009/0276771 | A1* | 11/2009 | Nickolov et al. ............. 717/177 |
| 2010/0138827 | A1* | 6/2010 | Frank et al. ....................... 718/1 |
| 2010/0146506 | A1* | 6/2010 | Lee et al. ........................... 718/1 |
| 2011/0184993 | A1* | 7/2011 | Chawla et al. ................ 707/802 |
| 2011/0185355 | A1* | 7/2011 | Chawla et al. .................... 718/1 |

FOREIGN PATENT DOCUMENTS

| KR | 1020100069237 A | 6/2010 |
| WO | 2007/001490 A2 | 1/2007 |

* cited by examiner

Primary Examiner — Emerson Puente
Assistant Examiner — Dong Kim
(74) Attorney, Agent, or Firm — Ladas & Parry LLP

(57) ABSTRACT

Disclosed are a system and method for managing personalization information of a virtual machine based on cloud computing.
An exemplary embodiment of the present invention provides a system for managing personalization information of a virtual machine, including: virtual desktops positioned in on-demand services zone, and created and driven on the basis of the virtual machine; zone servers transmitting the personalization information of the virtual machine on at least one virtual desktop positioned in the on-demand service zones, and local servers storing personalization information of virtual machine on at least one virtual desktop positioned in at least one on-demand service zone and synchronizing the personalization information of the virtual machine with another local server.

15 Claims, 8 Drawing Sheets

SYSTEM FOR MANAGING PERSONALIZATION INFORMATION OF VIRTUAL MACHINE BASED ON CLOUD COMPUTING AND METHOD THEREOF

CROSS-REFERENCE TO RELATED APPLICATIONS

This application claims priority to and the benefit of Korean Patent Application No. 10-2010-0125858 filed in the Korean Intellectual Property Office on Dec. 9, 2010, the entire contents of which are incorporated herein by reference.

TECHNICAL FIELD

The present invention relates to cloud computing, and particularly, to a system and method for managing personalization information of a virtual machine based on cloud computing, enabling a user to extract personalization information, store the personalization information in a local server, and use the personalization information anytime if necessary in a case of performing computing work using the virtual machine in an on-demand service zone and making it possible to synchronize the personalization information between a plurality of local servers positioned at different areas for supporting a wide area.

BACKGROUND

Cloud computing has been a big issue recently, and means a computing environment in which IT-related services such as data storing, networking, and use of contents can be used at a time through a server on the Internet. The cloud computing has brought a new change of a computing paradigm.

In other words, the cloud computing is a type of computing service enabling a user to rent computing resources such as hardware and software that exists intangibly, similar to a cloud, as much as the user needs and pay a usage fee for the computing resources, integrates computing resources exiting at different physical positions by a virtualization technology, and provides the integrated computing resources.

The cloud computing virtualizes and uses a computing power on the Internet together with a local computing power on the basis of a virtualization technology. As an actual service form of cloud computing, a virtual desktop service is being provided, and various methods for providing an on-demand virtual desktop to a user using cloud computing has been proposed.

Since a number of persons can perform private processes through one computer, development of technologies for providing the same computing environment anytime and anywhere in providing an on-demand virtual desktop based on a virtual machine to a user has been required.

SUMMARY

The present invention has been made in an effort to provide a system and method for managing personalization information of a virtual machine based on cloud computing, enabling a user to extract personalization information, store the personalization information in a local server, and use the personalization information anytime if necessary in a case of performing computing work using the virtual machine in an on-demand service zone.

Further, the present invention has been made in an effort to provide a system and method for managing personalization information of a virtual machine based on cloud computing, making it possible to synchronize the personalization information between a plurality of local servers positioned at different areas for supporting a wide area.

An exemplary embodiment of the present invention provides a system for managing personalization information of a virtual machine, including: virtual desktops positioned in on-demand service zones, and created and driven on the basis of the virtual machine; zone servers transmitting the personalization information of the virtual machine on at least one virtual desktop positioned in the on-demand service zones, and local servers storing personalization information of the virtual machine on at least one virtual desktop positioned in at least one on-demand service zone and synchronizing the personalization information of the virtual machine with another local server.

The on-demand service zones may represent service zones for providing virtual desktops based on a virtual machine to a user on demand.

The virtual desktop may include a virtual machine agent unit extracting personalization information when a user performs computing work using a virtual machine, and a transceiver transmitting and receiving the personalization information extracted from the virtual machine agent unit to and from the zone servers.

The zone server may include a virtual machine management unit performing a management function for creating and removing the virtual machine, a management machine agent unit transmitting personalization information requested by a user when the virtual machine is created, and a transceiver capable of communicating with a plurality of virtual desktops existing in the on-demand service zone.

The local server may include a personalization information managing unit dividing the personalization information into user information and virtual machine information, a synchronization managing unit synchronizing the personalization information with another local server, a user profile storing unit storing the personalization information, a virtual machine information storing unit storing the virtual machine information, and a transceiver transmitting and receiving personalization information to and from the zone server, or transmitting and receiving personalization information to and from another local server.

In order for communication between the zone server and the local server or between the local server and another local server, a TCP-based socket may be used to perform a TCP server function and a TCP client function.

Another exemplary embodiment of the present invention provides a method for managing personalization information of a virtual machine, including: allowing a zone server managing at least one virtual desktop existing in an on-demand service zone to receive personalization information from a virtual desktop; allowing the zone server to transmit a control message for requesting to store personalization information to a local server; allowing the zone server to transmit personalization information to the local server if the transmission of the control message is completed; and allowing the local server managing the at least one zone server to store the personalization information on the basis of the control message.

The on-demand service zone may represent a service zone for providing an on-demand virtual desktop based on a virtual machine to a user.

The control message may include at least one of a message ID meaning storing the personalization information, an ID of a user using a virtual machine, an ID of a virtual machine provided to the user, and the number of files of personalization information of a virtual machine.

The method for managing personalization information of a virtual machine may further include: allowing the local server to check whether the personalization information has been changed for each user at constant time intervals; and allowing the local server to transmit the changed personalization information to another local server if the personalization information has been changed.

Yet another exemplary embodiment of the present invention provides a method for managing personalization information of a virtual machine, including: allowing a zone server managing at least one virtual desktop existing in an on-demand service zone to be requested to create a virtual desktop based on a virtual machine; allowing the zone server to request a local server to transmit personalization information of the virtual machine regarding the virtual desktop; allowing the local server to transmit the stored personalization information to the zone server if the local server receives the request for transmission of the personalization information; and allowing the zone server to create the virtual desktop based on the virtual machine on the basis of the personalization information if the zone server receives the personalization information.

The on-demand service zone may represent a service zone for providing a virtual desktop based on a virtual machine to a user on demand.

The allowing the local server to transmit the stored personalization information may include allowing the local server to transmit a control message for responding to the request for transmission of the personalization information to the zone server if the local server receives the request for transmission of the personalization information, and allowing the local server to transmit the stored personalization information to the zone server if the transmission of the control message is completed.

The control message may include at least one of a message ID meaning transmission of the personalization information, an ID of a user to use the virtual machine, an ID of the virtual machine to be provided to the user, and the number of files of the personalization information of the virtual machine.

The allowing the zone server to create the virtual desktop may include allowing the zone server to create the virtual desktop based on the virtual machine by applying virtual machine information included in the personalization information, and allowing the zone server to applying user information included in the personalization information to the created virtual desktop based on the virtual machine.

According to the exemplary embodiments of the present invention, in a case where the user performs computing work using the virtual machine in an on-demand service zone, the user extracts the personalization information, stores the personalization information in the local server, and uses the personalization information anytime if necessary. Therefore, it is possible to provide the same computing environment to the user regardless of time and place.

Further, according to the exemplary embodiments of the present invention, the personalization information is synchronized between a number of local servers positioned at different areas for supporting a wide area. Therefore, it is possible to efficiently manage the personalization information.

DETAILED DESCRIPTION

Figure 1:
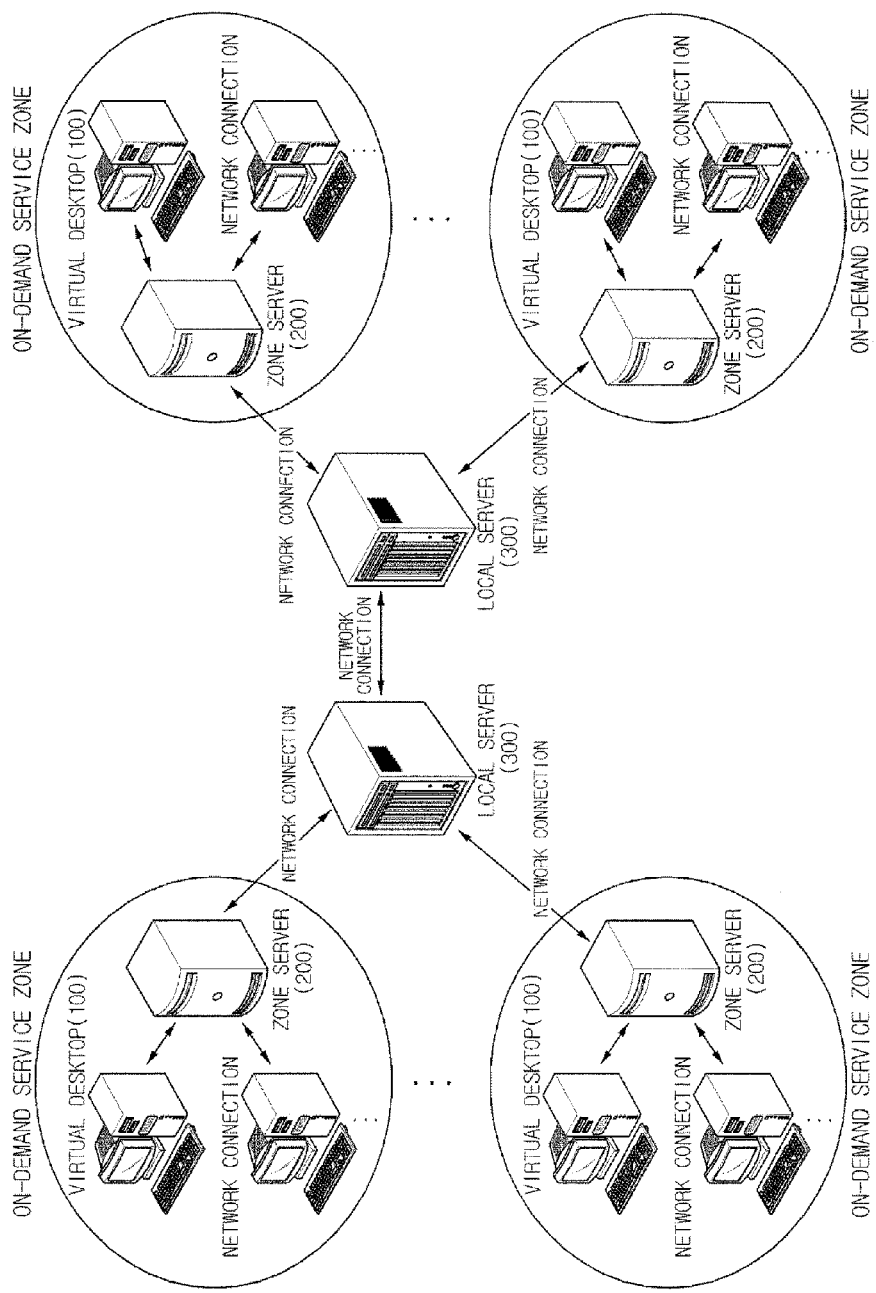
FIG. 1 is a view schematically illustrating a configuration of a whole system according to an exemplary embodiment of the present invention.

Various advantages and features of the present invention and methods accomplishing thereof will become apparent from the following description of embodiments with reference to the accompanying drawings. The present invention may, however, be embodied in many different forms without being limited to the embodiments set forth herein. However, the exemplary embodiments of the present invention will be described in detail so that a person with ordinary skilled in the art to which the present invention pertains may easily perform the technical ideas of the present invention.

In the drawings, the exemplary embodiments of the present invention are not limited to a specific form shown and are exaggerated in order to obtain clarity. Further, like reference numerals denote like components throughout the specification.

Hereinafter, a system and method for managing personalization information of a virtual machine based on cloud computing according to an exemplary embodiment of the present invention will be described with reference to the accompanying drawings, FIGS. 1 to 8.

In other words, the exemplary embodiments of the present invention propose solutions enabling a user to extract personalization information, store the personalization information in a local server, and use the personalization information anytime if necessary in a case of performing computing work using a virtual machine VM in an on-demand service zone and making it possible to synchronize the personalization information between a plurality of local servers positioned at different areas for supporting a wide area.

FIG. 1 is a view schematically illustrating a configuration of a whole system according to an exemplary embodiment of the present invention.

As shown in FIG. 1, a system for managing personalization information of a virtual machine according to the exemplary embodiment of the present invention includes a virtual desktop 100, a zone server 200, and a local server 300, which are apparatuses capable of communicating with one other through wire/wireless networks. The virtual desktop 100 is a virtual computer positioned in an on-demand service zone and provided to a user, and the on-demand service zone means a service zone for providing an on-demand virtual desktop based the virtual machine to the user. The virtual desktop 100 may be implemented in various electronic apparatuses such as a personal computer (PC) and a smart phone.

Services capable of being provided in the on-demand service zone may provide peripheral devices such as a mouse, a keyboard, and a monitor, a hard disk, a memory, a central processing unit (CPU), and the like to the user in a virtual machine form, similarly to general desktop use.

The virtual desktop 100, which is a virtual computer created and provided by a request of the user, can be dynamically created and removed, and can be connected to a necessary input/output device by a request of the user.

The zone server 200 is a server for managing a virtual desktop dynamically created and removed in one on-demand service zone. The zone server 200 can manage personalization information of the virtual machine forming each virtual desktop within the on-demand service zone range.

The local server 300, which is a server for managing a plurality of on-demand service zones, can transmit and receive information by communicating with the zone server 200 positioned at each on-demand service zone.

More specifically, the local server 300 may receive and store the personalization information of the virtual machine from a zone server in the on-demand service zone under control, and transmit personalization information on a specific user if the zone server requests the personalization information on the specific user.

In order to ensure mobility of the user, the local server 300 can synchronize the personalization information with another local server to transmit the personalization information when the user moves to another local area and requests the personalization information on the user in an on-demand service zone under the control of another local server.

In this case, in order for communication between the zone server and the local server or between the local server and another local server, a TCP-based socket may be used to perform a TCP server function and a TCP client function.

Figure 2:
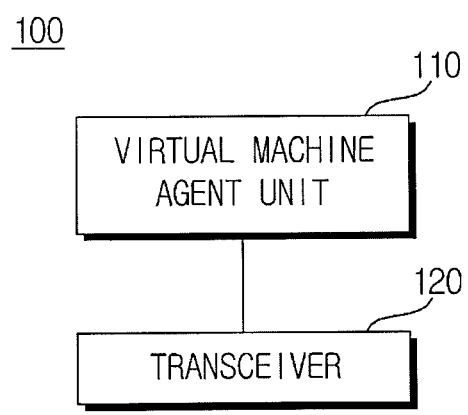
FIG. 2 is a view illustrating a detailed configuration of a virtual desktop 100 shown in FIG. 1.

FIG. 2 is a view illustrating a detailed configuration of the virtual desktop 100 shown in FIG. 1.

As shown in FIG. 2, the virtual desktop 100 according to the exemplary embodiment of the present invention is a virtual computer created by a request of the user, and may include a virtual machine agent unit 110, and a transceiver 120.

The virtual machine agent unit 110 can extract the personalization information such as files changed when the user performs computing work using the virtual machine and set information changed by the user when a program is used.

The transceiver 120 can transmit and receive the extracted personalization information to and from the zone server. That is, the transceiver 120 can transmit and receive the personalization information or a control message or a control signal related to creation and removal of the virtual machine to and from the zone server.

In this case, the virtual machine agent unit 110 extracts the personalization information and provides the personalization information to the zone server. In this case, (1) the virtual machine agent unit 110 may periodically extract the personalization information during the computing work and provide the personalization information to the zone server, or (2) the virtual machine agent unit 110 may extract the personalization information after the computing work finishes and provide the personalization information to the zone server.

Figure 3:
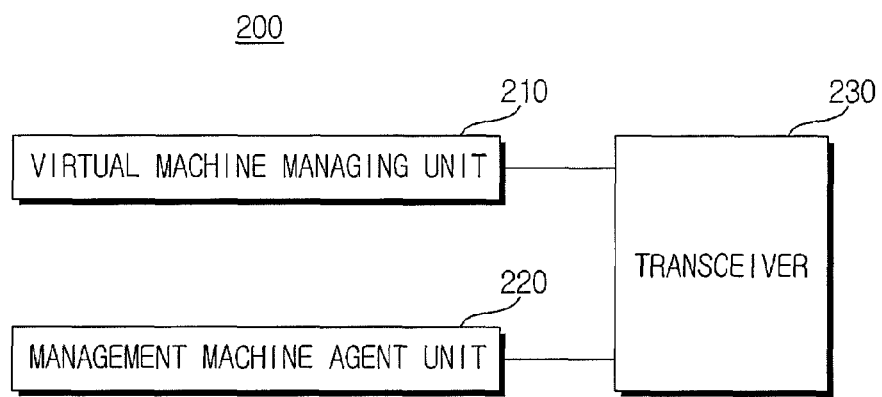
FIG. 3 is a view illustrating a detailed configuration of a zone server 200 shown in FIG. 1.

FIG. 3 is a view illustrating a detailed configuration of the zone server 200 shown in FIG. 1.

As shown in FIG. 3, the zone server 200 according to the exemplary embodiment of the present invention may include a virtual machine managing unit 210, a management machine agent unit 220, a transceiver 230, and so on.

The virtual machine managing unit 210 may create the virtual machine on a hypervisor such as Xen and Virtual Box, and perform a virtual machine managing function of managing a life period of the virtual machine.

The management machine agent unit 220 may transmit the personalization information for installing an operating system (OS), a CPU, a hard disk, application programs, and the like requested by the user when the virtual machine is created, by using functions provided from the virtual machine managing unit.

The transceiver 230 may communicate with a number of virtual desktops existing in the on-demand service zone. That is, the transceiver 230 may transmit and receive the personalization information or a control message or a control signal related to the creation, removal, and the like of the virtual machine to and from a number of virtual desktops.

The transceiver 230 may transmit and receive the personalization information of the virtual machine created for each user to and from the local server.

Figure 4:
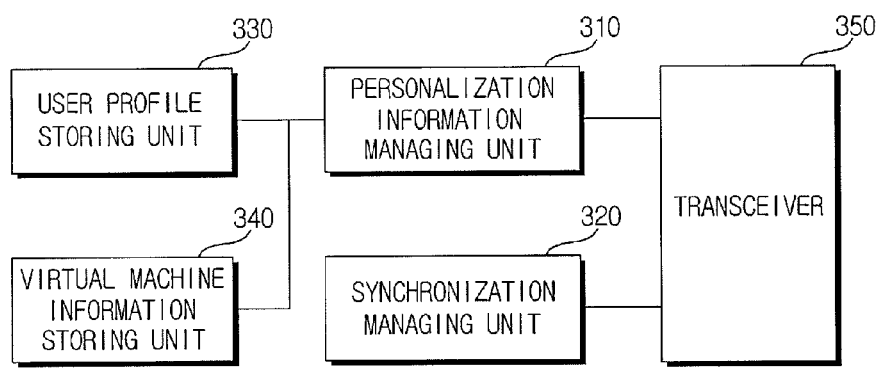
FIG. 4 is a view illustrating a detailed configuration of a local server 300 shown in FIG. 1.

FIG. 4 is a view illustrating a detailed configuration of the local server 300 shown in FIG. 1.

As shown in FIG. 4, the local server 300 according to the exemplary embodiment of the present invention may include a personalization information managing unit 310, a synchronization managing unit 320, a user profile storing unit 330, a virtual machine information storing unit 340, a transceiver 350, etc. The local server 300 having the above-mentioned configuration may receive the personalization information of the virtual machine from the zone server positioned in each on-demand service zone, store the personalization information of the virtual machine, and synchronize the personalization information of the virtual machine with a local server of another local area.

The personalization information managing unit 310 may divide the personalization information received when the zone server requests the local server to store the personalization information into user information and virtual machine information, and store the user information and the virtual machine information in the user profile storing unit 330 and the virtual machine information storing unit 340, respectively. Also, if the zone server requests the personalization information, the personalization information managing unit 310 can transmit the personalization information stored in the user profile storing unit 330 and the virtual machine information storing unit 340. The synchronization managing unit 320 may synchronize the personalization information created for each user with another local server.

The user profile storing unit 330 may store and manage an ID of a user using an on-demand service and so on. The virtual machine information storing unit 340 may store and manage information of the virtual machine, which the user using the on-demand service uses for computing work.

The transceiver 350 may transmit and receive the personalization information to and from the zone server or transmit and receive the personalization information to and from another local server.

A method for managing personalization information of a virtual machine according to an exemplary embodiment of the present invention may include (1) a method of storing personalization information changed due to use of a virtual desktop, (2) a method of transmitting personalization information to be applied to a virtual machine of a virtual desktop to be used, and (3) a method of synchronizing personalization information between different local servers, of which each will be described below.

Figure 5:
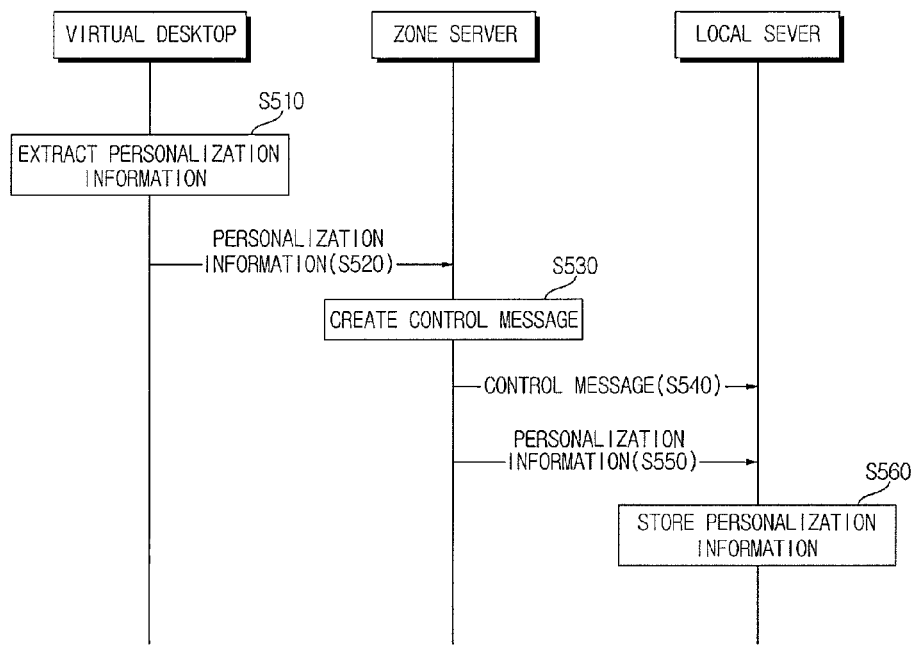
FIG. 5 is a view illustrating a method of storing personalization information according to an exemplary embodiment of the present invention.

FIG. 5 is a view illustrating a method of storing the personalization information according to an exemplary embodiment of the present invention.

As shown in FIG. 5, in a case where the user is allocated a virtual machine in an on-demand service zone and uses a virtual desktop, the virtual desktop extracts personalization information such as files changed when computing work is performed and set information changed by the user during use of a program in step S510, and transmits the personalization information to a zone server managing the corresponding on-demand service zone in step S520.

If receiving the personalization information from the virtual desktop, the zone server attempts connection with a local server. If connected to the local server, the zone server creates a control message for requesting the local sever to store the personalization information in step S530, and transmits the created control message to the local server in step S540. Here, the control message may include a message ID meaning storing the personalization information, an ID of the user to use a virtual machine, an ID of the virtual machine to be provided to the user, the number of files of the personalization information of the virtual machine, etc.

If completing the transmission of the control message, the zone server transmits the personalization information to the local server in step S550 and ends the connection.

Then, the local server stores the personalization information in each of the user profile storing unit and the virtual machine information storing unit on the basis of the control message in step S560. In this case, the local server may store user information in the user profile storing unit and store virtual machine information in the virtual machine information storing unit in step S560.

Figure 6:
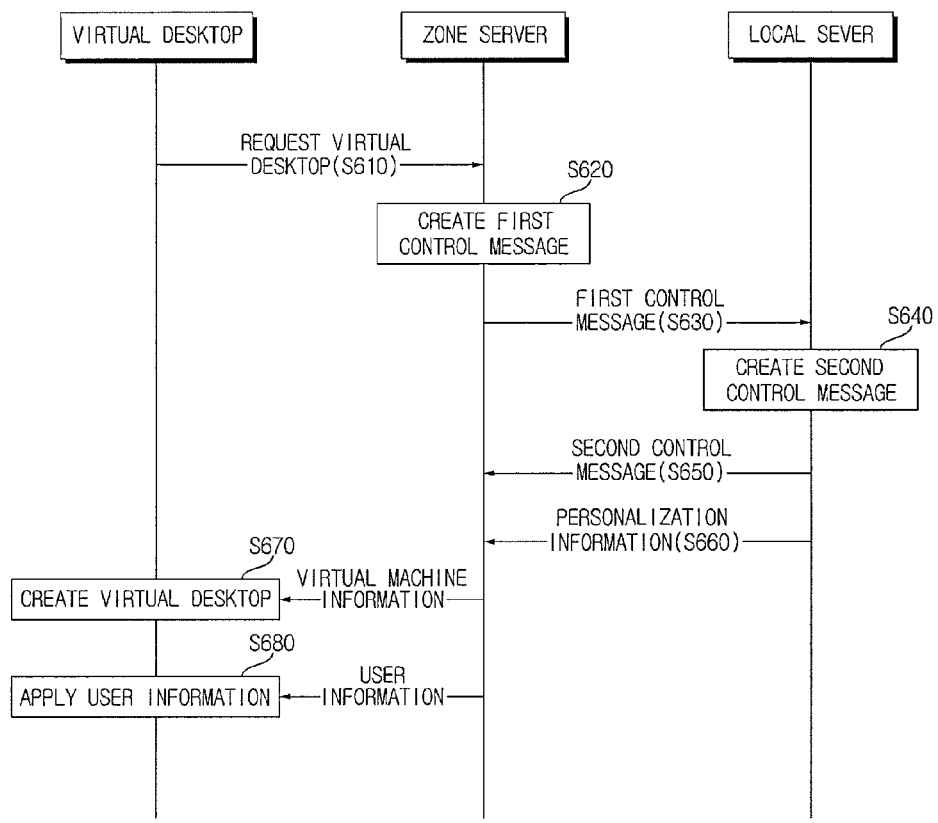
FIG. 6 is a first view illustrating a method of transferring the personalization information according to an exemplary embodiment of the present invention.

FIG. 6 is a first view illustrating a method of transferring the personalization information according to an exemplary embodiment of the present invention.

As shown in FIG. 6, if the user enters an on-demand service zone and requests a virtual desktop based on the virtual machine to the zone server in step S610, the zone server may attempt connection with the local server.

If connected to the local server, the zone server creates a first control message for requesting transmission of the personalization information in step S620, transmits the created first control message to the local server in step S630, and ends the connection. Here, the control message may include a message ID meaning transmission of the personalization information, the ID of the user to use the virtual machine, etc.

If receiving the control message, the local server attempts connection with the zone server. If connected to the zone server, the local server creates a second control message for responding to the request for transmission of the personalization information in step S640, and transmits the created second control message to the zone server in step S650. Here, the control message may include a message ID meaning transmission of the personalization information, the ID of the user to use the virtual machine, the virtual machine ID to be provided to the user, and the number of files of the personalization information of the virtual machine, etc.

If completing the transmission of the control message, the local server transmits the stored personalization information to the zone server in step S660, and ends the connection.

If receiving the personalization information, the zone server can create the virtual desktop based on the virtual machine in a user terminal on the basis of the personalization information. That is, the zone server creates the virtual desktop based on the virtual machine by applying the virtual machine information included in the personalization information in step S670, and applies the user information included in the personalization information to the created virtual desktop based on the virtual machine in step S680.

Figure 7:
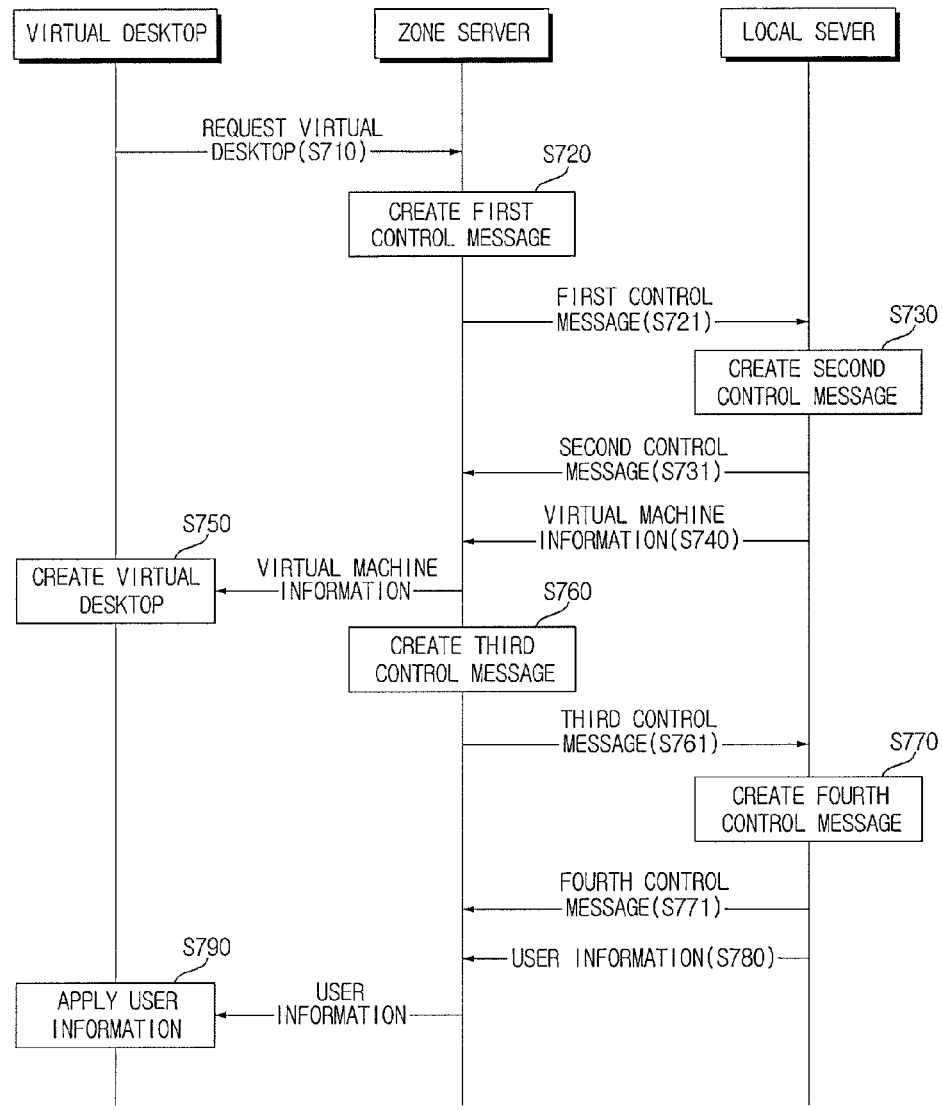
FIG. 7 is a second view illustrating the method of transferring the personalization information according to an exemplary embodiment of the present invention.

FIG. 7 is a second view illustrating the method of transferring the personalization information according to an exemplary embodiment of the present invention.

As shown in FIG. 7, if the user enters the on-demand service zone and requests the virtual desktop based on the virtual machine to the zone server in step S710, the zone server may attempt connection with the local server.

If connected to the local server, the zone server creates a first control message for requesting transmission of the virtual machine information of the personalization information in step S720, transmits the created first control message to the local server in step S721, and ends the connection. Here, the control message may include a message ID meaning transmission of the virtual machine information, the ID of the user to use the virtual machine, etc.

If receiving the control message, the local server attempts connection with the zone server. If connected to the zone server, the local server creates a second control message for responding to the request for transmission of the virtual machine information in step S730, and transmits the created second control message to the zone server in step S731. Here, the control message may include a message ID meaning transmission of the virtual machine information, the ID of the user to use the virtual machine, the ID of the virtual machine to be provided to the user, the number of files of the virtual machine information, etc.

If completing the transmission of the control message, the local server transmits the stored virtual machine information to the zone server in step S740, and ends the connection. If receiving the virtual machine information, the zone server can create the virtual desktop based on the virtual machine in the user terminal on the basis of the virtual machine information in step S750.

Then, the zone server may attempt connection with another local server. If connected to the local server, the zone server creates a third control message for requesting transmission of the user information of the personalization information in step S760, transmits the created third control message to the local server in step S761, and ends the connection. Here, the control message may include a message ID meaning transmission of the user information, the ID of the user to use the virtual machine, the ID of the virtual machine to be provided to the user, etc.

If receiving the control message, the local server attempts connection with the zone server. If connected to the zone server, the local server creates a fourth control message for responding to the request for transmission of the user information in step S770, transmits the created fourth control message to the zone server in step S771, and ends the connection. Here, the control message may include a message ID meaning transmission of the user information, the ID of the user to use the virtual machine, the ID of the virtual machine to be provided to the user, the number of files of the user information, etc.

If completing the transmission of the control message, the local server transmits the stored user information to the zone server in step S780, and ends the connection. If receiving the user information, the zone server can apply the user information to the already created virtual desktop based on the virtual machine in step S790.

Figure 8:
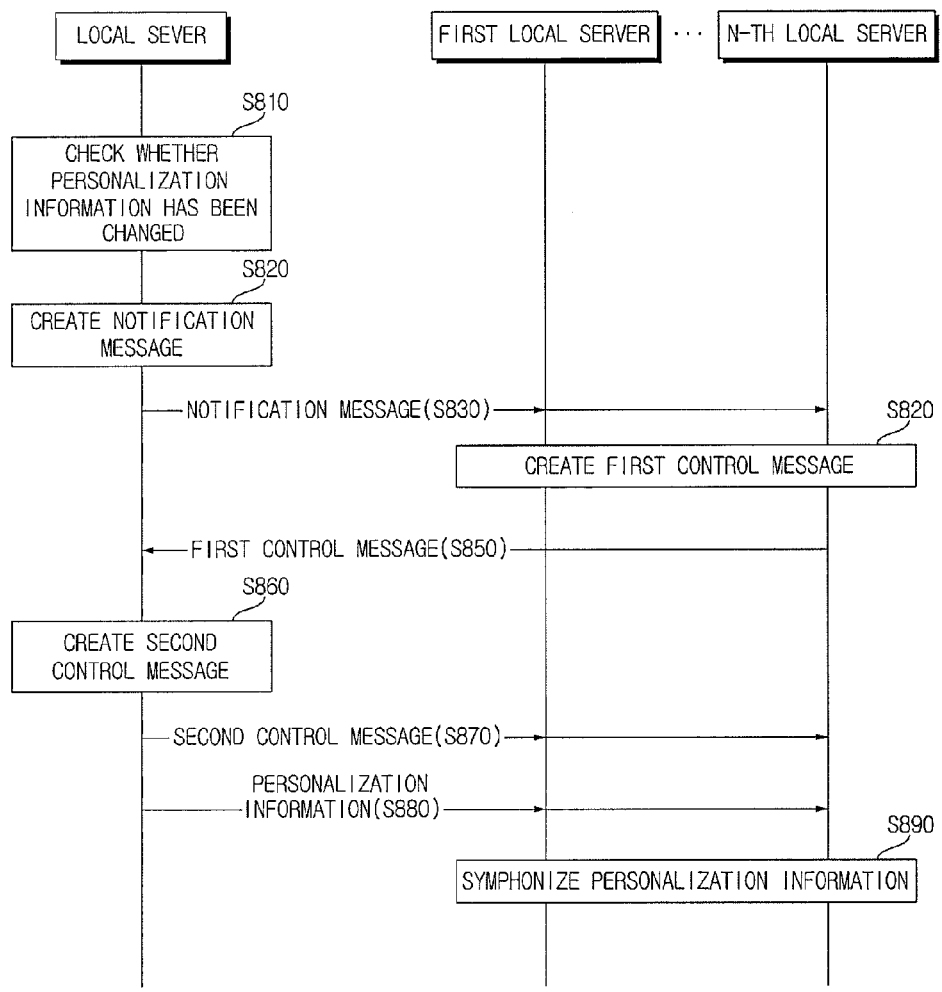
FIG. 8 is a view illustrating a method of synchronizing the personalization information according to an exemplary embodiment of the present invention.

FIG. 8 is a view illustrating a method of synchronizing the personalization information according to an exemplary embodiment of the present invention.

As shown in FIG. 8, the local server may check whether the personalization information generated for each user has been changed or not at constant time intervals in step S810, create a notification message for informing a change in the personalization information in step S820 if it is determined that the personalization information has been changed, and transmit the created notification message to another local server in step S830.

If receiving the notification message, the another local server may create a first control message for requesting for synchronization of the personalization information in step S840, and transmit the created first control message to the local server in step S850. Here, the control message may include a message ID meaning synchronization of the personalization information, the ID of the user to use the virtual machine, etc.

If receiving the first control message, the local server create a second control message for responding to the request for synchronization of the personalization information in step S860, and transmits the created second control message to the another local server in step S870. Here, the control message can transmit a message ID meaning the synchronization of the personalization information, the ID of the user to use the virtual machine, the ID of the virtual machine to be provided to the user, the number of files of the personalization information, etc.

If completing the transmission of the control message, the local server transmits the stored personalization information to the another local server in step S880. If receiving the personalization information, the another local server can perform synchronization by updating personalization information stored in advance with the received personalization information in step S890.

In this case, synchronization of the personalization information between local servers geographically away from each other may be politically determined during actual service application, and if the mobility of the user is predictable, in consideration of the mobility, synchronization of the personalization information of the virtual machine between local servers may be implemented in various forms.

The system and method for managing personalization information of a virtual machine based on cloud computing according to the exemplary embodiments of the present invention can be variously changed and modified within a range which is not deviated from the fundamental features of the present invention by those skilled in the art. Therefore, the exemplary embodiments of the present invention described above are used in a generic and descriptive sense only and not for purposes of limitation. The scopes and sprits of the present invention should not be limited to the above-described exemplary embodiments and the following claims as well as all modified equally or equivalently to the claims are intended to fall within the scopes and spirits of the invention.

What is claimed is:

1. A system for managing personalization information of a virtual machine, comprising:
a computer system comprising a processor and a memory;
virtual desktops positioned in respective on-demand services zones, and created and driven on the basis of the virtual machine;
zone servers operating on the computer system and adapted for transmitting the personalization information of the virtual machine on at least one virtual desktop positioned in an on-demand service zone of the respective on-demand services zones, wherein the zone servers transmit a control message for requesting storing personalization information to a local server, wherein the control message includes a message ID meaning storing the personalization information, an ID of a user to use a virtual machine, and the number of files of personalization information of a virtual machine, and local servers storing personalization information of virtual machine on at least one virtual desktop positioned in the at least one on-demand service zone and synchronizing the personalization information of the virtual machine with another local server.

2. The system of claim 1, wherein each of the respective on-demand service zones represent service zones for providing respective virtual desktops based on a virtual machine to a user on demand.

3. The system of claim 1, wherein the virtual desktop includes
a virtual machine agent unit extracting personalization information when a user performs computing work using a virtual machine, and
a transceiver transmitting and receiving the personalization information extracted from the virtual machine agent unit to and from the zone servers.

4. The system of claim 1, wherein the zone servers include:
a virtual machine management unit performing a management function for creating and removing the virtual machine,
a management machine agent unit transmitting personalization information requested by a user when the virtual machine is created, and
a transceiver capable of communicating with a number of virtual desktops existing in the on-demand service zone.

5. The system of claim 1, wherein the local servers include:
a personalization information managing unit dividing the personalization information into user information and virtual machine information,
a synchronization managing unit synchronizing the personalization information with local servers,
a user profile storing unit storing the personalization information,
a virtual machine information storing unit storing the virtual machine information, and
a transceiver transmitting and receiving personalization information to and from the zone servers, or transmitting and receiving personalization information to and from a local server among the focal servers.

6. The system of claim 1, wherein in order for communication between the zone servers and the local servers or between the local servers, a TCP-based socket is used to perform a TCP server function and a TCP client function.

7. A method for managing personalization information of a virtual machine, comprising:
allowing a zone server managing at least one virtual desktop existing in an on-demand service zone to receive personalization information from a virtual desktop;
allowing the zone server to transmit a control message for requesting storing personalization information to a local server,
allowing the zone server to transmit personalization information to the local server if the transmission of the control message is completed; and
allowing the local server managing the zone server to store the personalization information on the basis of the control message, wherein the control message includes a message ID meaning storing the personalization information, an ID of a user to use a virtual machine, an ID of a virtual machine to be provided to the user, and the number of files of personalization information of a virtual machine.

8. The method of claim 7, wherein the on-demand service zone represents a service zone for providing an on-demand virtual desktop based on a virtual machine to a user.

9. The method of claim 7, further comprising:
allowing the local server to check whether the personalization information has been changed for each user at constant time intervals; and
allowing the local server to transmit the changed personalization information to another local server if the personalization information has been changed.

10. The method of claim 7 wherein the local server transmits a notification message to a second local server when it is determined that user information has changed.

11. A method for managing personalization information of a virtual machine, comprising:
allowing a zone server managing at least one virtual desktop existing in an on-demand service zone to be requested to create a virtual desktop based on a virtual machine;
allowing the zone server to request a local server to transmit personalization information of the virtual machine regarding the virtual desktop;
allowing the local server to transmit the stored personalization information to the zone server if the local server receives the request for transmission of the personalization information, and allowing the local server to transmit a control message for responding to the request for transmission of the personalization information to the zone server if the local server receives the request for transmission of the personalization information, wherein the control message includes a message ID meaning transmission of the personalization information, an ID of a user to the virtual machine, an ID of the virtual machine to be provided to the user, and the number of files of the personalization information of the virtual machine; and
allowing the zone server to create the virtual desktop based on the virtual machine on the basis of the personalization information if the zone server receives the personalization information.

12. The method of claim 11, wherein the on-demand service zone represents a service zone for providing a virtual desktop based on a virtual machine to a user on demand.

13. The method of claim 11, wherein the local server to transmit the stored personalization information includes, and
allowing the local server to transmit the stored personalization information to the zone server if the transmission of the control message is completed.

14. The method of claim 11, wherein the allowing the zone server to create the virtual desktop includes
allowing the zone server to create the virtual desktop based on the virtual machine by applying virtual machine information included in the personalization information, and
allowing the zone server to applying user information included in the personalization information to the created virtual desktop based on the virtual machine.

15. The method of claim 11 wherein the local server transmits a notification message to a second local server when it is determined that user information has changed.

* * * * *